United States Patent [19]
Ecker

[11] 3,894,148
[45] July 8, 1975

[54] PROCESS FOR ENHANCING THE ENERGY METABOLISM OF AN ATHLETE

[75] Inventor: Richard E. Ecker, Hinsdale, Ill.

[73] Assignee: Vitose Corporation, Clarendon Hills, Ill.

[22] Filed: Mar. 22, 1974

[21] Appl. No.: 454,011

[52] U.S. Cl. .............................................. 424/180
[51] Int. Cl.² ......................................... A61K 31/70
[58] Field of Search ................................... 424/180

[56] References Cited
UNITED STATES PATENTS

| | | | |
|---|---|---|---|
| 3,009,859 | 11/1961 | Laboret et al. | 424/180 |
| 3,513,023 | 5/1970 | Kusch et al. | 424/180 |
| 3,607,392 | 9/1971 | Lauer et al. | 424/180 |

*Primary Examiner*—Elbert L. Roberts
*Assistant Examiner*—Cary B. Owens
*Attorney, Agent, or Firm*—Hume, Clement, Brinks, Willian, Olds & Cook, Ltd.

[57] ABSTRACT

A process for enhancing an athlete's energy metabolism which includes eliminating the consumption of insulin-inducing foods prior to competition and administering to the athlete the sugar, fructose. The process may be utilized in conjunction with specific dietary regimen and conditioning programs to increase the glycogen and blood sugar levels within the athlete thereby improving physical endurance.

5 Claims, No Drawings

PROCESS FOR ENHANCING THE ENERGY METABOLISM OF AN ATHLETE

THE FIELD OF THE INVENTION

The present invention relates generally to a nutritional and conditioning program designed to prepare athletes for endurance competition. More particularly, the present invention relates to a process for enhancing the energy metabolism of an athlete such that physical endurance during competition is improved.

BACKGROUND OF THE INVENTION

Sugar is the fuel from which body cells obtain energy for cellular activities. When the diet contains carbohydrates, fats and proteins these foods are broken down to smaller units, as for example sugar and colloidal fats, by the enzymes and acids of the digestive tract. These smaller molecules are then carried by the blood to the cells which use the sugars immediately or store any excess sugar as glycogen or fat.

The energy for athletic activity, and indeed all muscular work, comes primarily from the oxidation of glycogen stored in the muscles. If the oxidation is "aerobic," that is, if the carbohydrate is burned completely in the presence of oxygen to produce carbon dioxide and water, the derivation of energy is about 20 times more efficient than when the oxidation is "anaerobic," that is, without oxygen. When excercise is very intense and short in duration, such that the respiratory and cardio-vascular systems of the body do not have sufficient time to deliver oxygen to the muscles, the energy for this activity will be derived almost exclusively from anaerobic metabolism. Under these circumstances the athlete accumulates an "oxygen debt"; the athlete's tissues use a mechanism of carbohydrate oxidation that requires no oxygen. The by-product of this oxygen debt is lactic acid, every unit of which is equivalent to a specified amount of oxygen required to restore the system to its pre-exercise or recovered state. Thus, the body utilizes an energy producing mechanism in which relatively short periods of muscular activity can be supported by an inefficient, oxygen-independent energy metabolism, incurring an oxygen debt that must be repaid later when oxygen is available. After recovery the system will show a net decrease in total carbohydrate (muscle glycogen) equivalent to that expended in performing the muscular work.

Of course, exercise can also be almost completely aerobic, if it is of sufficiently mild intensity that the individual's ability to deliver oxygen to the muscles exceeds, or at least equals, the oxygen demand created by the exercise. The kind of exertion required in endurance athletic events, falls somewhere between the two extremes of complete anaerobic and complete aerobic energy metabolism. Because of the much greater efficiency of aerobic metabolism, it is a distinct advantage for the endurance athlete to find ways to increase the proportion of aerobic oxidation in his total energy metabolism during competition.

In simplified terms, the total process by which fuel (carbohydrate) is consumed to produce energy for physical exertion can be looked upon as the sum of two opposing processes--fatigue and recovery. Normally we consider recovery only in terms of those processes that are operative after the competition and through which the body is restored to its pre-competition state. However, in all endurance competition the physiological processes responsible for recovery also are in operation during the competition, and they serve to extend the time required to reach exhaustion. In other words, the rate of fuel consumption and the time required to reach exhaustion are determined by a balance between the fatigue process and the recovery process.

Since in the well-trained athlete, exhaustion is the ultimate event that limits endurance, it is apparent that better performance in endurance competition will be accomplished by the athlete who more successfully defers the onset of exhaustion. This deferral can be accomplished from two different approaches. First, the efficiency of fuel consumption can be maximized. In the endurance athlete this is accomplished through exercise and conditioning. Such conditioning is designed to maximize the proportion of aerobic oxidation in his energy metabolism. This results in the development of increased respiratory and cardio-vascular capabilities which allow the system to deliver more oxygen to the affected muscle cells and more efficiently dispose of the lactic acid produced from anaerobic metabolism. In effect, the athlete develops better recovery metabolism and, therefore, lowers the rate of fuel consumption.

The second approach that can be used to defer the onset of exhaustion is to guarantee a full fuel capacity before the competition begins. In the athlete this can be accomplished by maximizing the carbohydrates reserves (glycogen) in the muscles prior to competition and by assuring high levels of easily-available carbohydrate in the blood and tissue fluids during competition.

One method known in the art for increasing glycogen stores in the athlete comprises a program called "glycogen depletion-enrichment." In an illustrative example of this program, carbohydrate intake is completely or substantially eliminated for about three days. Concurrently the athlete conducts prolonged, exhausting workouts to deplete the already low store of glycogen in the muscles. Then, for about three days prior to the competition the athlete increases carbohydrate consumption to an excessively high level and concurrently decreases the level of exertion in the workouts. This process causes compensation and deposition of glycogen stores within the muscles to twice or three times normal capacity.

While this process is of course valuable to the athlete attempting to enhance his endurance, it has a number of disadvantages. Most importantly, the process appears to provide only a one-time enhancement of the glycogen storage capacity of the cells; there does not appear to be any increase in the capacity of the cells to store glycogen over an extended period of time. Moreover, the glycogen depletion-enrichment process requires 3 days or more of low carbohydrate intake followed by 3 days or more of high carbohydrate intake. Therefore, the process requires at least 6 or 7 days to provide the increased glycogen stores. Thus, this process is not one amenable to athletes who must perform in competitive events which occur at intervals of less than about 1 week.

It is, therefore, apparent that there is a need within the art for a dietary and conditioning regimen which allows the athlete to: (1) replace the glycogen which has been depleted due to physical activity in prior competition, (2) gradually increase the glycogen storage capacity of the muscles and (3) specifically enhance the supply of available carbohydrate in the blood and tissue fluids during competition.

SUMMARY OF THE INVENTION

The subject matter of the present invention is a process for enhancing the energy metabolism and physical endurance of athletes. Generally, the process comprises the steps of restricting the consumption by the athlete of substantially all insulin-inducing carbohydrates for a predetermined period before competition of sufficient duration such that during the competition the amount of insulin within the blood of the athlete will be lowered to near minimum levels; and administering to the athlete during this pre-competition period between about 5 and 50 grams of fructose. This process may preferably be combined with a dietary and exercising regimen such that the athlete's capacity to store glycogen will be improved. Significantly, the process of the present invention may be utilized by athletes who participate in competitive events once or twice per week or even more frequently.

DETAILED DESCRIPTION OF THE INVENTION

The unique aspect of the process of the present invention is its use of the sugar, fructose, in conjunction with a glycogen replacement dietary program. Fructose is closely related to the sugar, glucose, which is the primary sub-unit of all nutritive carbohydrates. Like glucose, fructose is an energy food and can be utilized by the cells of the body to derive energy. Like glucose, and all nutritive carbohydrates, fructose provides about four calories of food energy per gram. However, in many other respects, fructose is very different from glucose. Some of these differences are: (1) unlike glucose, fructose does not stimulate the production of insulin, (2) unlike glucose, fructose does not require the presence of insulin for its metabolism, (3) glucose is actively and rapidly transported out of the digestive system into the blood, at the expense of some energy, whereas fructose is passively and slowly transported with little or no energy consumption, (4) once in the circulation, fructose can be more readily utilized for energy by the cells than can glucose.

Accordingly, fructose is an excellent energy food for athletes. First, in the absence of glucose-containing (insulin-inducing) carbohydrates, fructose can raise blood sugar levels without subsequently causing the typical insulin-initiated decrease in blood sugar. Thus, a higher blood sugar level may be maintained for longer periods through the use of fructose than is possible with glucose. It should be noted further that, although muscular work is the main cause of energy consumption during competition, it is not the only cause. Other tissues, notably the brain, also require substantial energy during that period. These tissues, however, cannot store glycogen like the liver and muscles and therefore must have blood sugar for energy. Some scientists believe that diminished availability of blood sugar to the central nervous system is the major contributing factor in the ultimate exhaustion of the well-trained athlete.

Furthermore, the slow transport of fructose out of the digestive tract, its easy acess to tissue cells and rapid utilization without the need for insulin, assure that dietary fructose will not cause blood sugar to elevate beyond safe levels. Rather, the slow assimilation of fructose from the digestive tract is advantageous to the athlete since it permits the digestive tract to serve as a substantial energy fuel reservoir. This reservoir, in turn, allows the fructose-associated elevation in blood sugar to continue for extended periods of time. Finally, because the transport of fructose out of the digestive tract requires little or no energy and because, as a simple sugar, fructose requires no digestion, this reservoir can be continuously tapped during competition without diverting energy from muscular work.

There are four basic dietary regimens which are used in conjunction with the process of the present invention:

1. The Normal Diet which is utilized is full-calorie and nutritionally balanced; it contains sufficient calories to meet the normal energy needs of the athlete and contains appropriate quantities of all the essential food groups. The only restriction required is that excesses of carbohydrates are to avoided.

2. The Excess Carbohydrate Diet utilized in this invention contains appropriate quantities of all the essential food groups and excesses of carbohydrates; i.e., fruits, starches, desserts, sugar-sweetened soft drinks, etc. These carbohydrates can be added both during meals and as snacks.

3. The Pre-Competition Diet should include only a light meal low starches which is completed at least 4 hours prior to competition. This meal can be completely eliminated if desired. Additionally this diet restricts the intake of all insulin-inducing carbohydrates for the same 4 hour period. In the place of such foods fructose should be consumed in an amount of between about 5 and 50 grams. It is particularly preferable that between about 10 and 20 grams of fructose be consumed in the hour immediately prior to competition.

4. The Pre-Workout Diet is the same as that used for the Pre-Competition Diet. It should be light, low in starches, and should be completed as early as possible before the workout. However, because this meal is a part of an athlete's total pre-competition nutritional program it should not be eliminated. The pre-workout schedule should duplicate as closely as is possible the pattern to be followed on the day of competition.

In accordance with the process of the present invention the above-identified dietary regimens are used in conjunction with exercise and conditioning programs to enable the athlete to increase his glycogen capacity and improve his physical endurance. This is accomplished by dividing the period between competitive events into three portions during which both exercise and carbohydrate consumption are regulated in a particular manner. During the first portion of the period between competitive events the athlete conducts exhaustive exercises so as to deplete, to a substantial degree the glycogen stored within his muscle cells. During this first portion the Normal Diet is utilized so that the athlete may daily replenish part of the depleted glycogen and, thus, allow more extended workouts. During the intermediate portion of the period between competitive events the athlete's exercises are non-exhaustive in nature and sufficient to maintain the proper muscle tone and muscle balance. During this intermediate portion the consumption of carbohydrates by the athlete is increased to an amount in excess of that normally required. Thus, the athlete utilizes the Excess Carbohydrate Diet. In the final portion of the period between competitive events the athlete employs the Pre-Competition Diet.

One of the significant advantages to the process of the present invention is its extreme flexibility. Thus, the process may be used effectively where the period between competitive events extends to as long as 5 to 8 days or for shorter periods between competitive events, i.e., 3 to 4 days. For example, where the period between competitive events is 6 days the first portion will comprise about 3 days, the intermediate portion will comprise about 3 days, and the final portion of this period will comprise at most 1 day and at least about 4 hours. Similarly, where the period between competitive events is about 3 to 4 days, then the first portion will comprise about 1 to 2 days, the intermediate portion will comprise about 1 to 3 days, and the final portion of the period will comprise at most about 1 day and at least about 4 hours.

The underlying theory for the improved physical endurance resulting from the present invention is not completely understood. However, it is believed that higher levels of insulin in the blood adversely affect the overall energy-producing capabilities of the body. It is further believed that the repeated and limited glycogen depletion (in contrast to total depletion taught in the glycogen depletion-enrichment process of the prior art) followed by repeated glycogen replenishment through carbohydrate consumption results in increased glycogen storage capacity.

Accordingly, through the use of fructose coupled with an appropriate dietary regimen and a regulated exercise-conditioning program the athlete should be able to increase the glycogen storage capacity of his muscle cells, increase his blood sugar level prior to competition, enhance his energy metabolism and thereby improve his physical endurance. Moreover, for reasons not completely understood at present, the consumption of fructose as in the Pre-Competition Diet coupled with the elimination of all insulin-inducing carbohydrates also appears to enhance the recovery processes of the body such that the athlete is able to come back stronger in repeated events. Therefore, through continued use of the Pre-Competition Diet, fructose can be employed by athletes who must compete in a day-long sequence of events or on successive days.

Finally, where the nature of the competitive event or the environmental conditions cause the athlete to perspire excessively, an alternative fructose-based dietary supplement should be utilized. This supplement contains, in addition to fructose, quantities of sodium, potassium and chloride in the proportions they are given up by the body through perspiration. The additional minerals of magnesium, calcium, iron and phosphorous may also be utilized since these elements aid in energy metabolism. The supplement may be provided, as may be pure fructose, in any of the various food forms known in the art as, for example, tablets or water solution. A typical formulation for the fructose-electrolyte tablet (in milligrams per tablet) is:

| | |
|---|---|
| potassium chloride | 22 |
| sodium chloride | 62 |
| sodium citrate dihydrate | 68 |
| tribasic magnesium phosphate | 3 |
| tribasic calcium phosphate | 10 |
| ferrous sulfate heptahydrate | 00.4 |
| fructose | 2000 |
| (plus flavor, color, lubricants and binders) | |

A formulation for the fructose-electrolyte solution (in milligrams per 100 milliliters of water) is:

| | |
|---|---|
| potassium chloride | 15 |
| tri-potassium phosphate | 21 |
| sodium chloride | 122 |
| tri-sodium phosphate | 45 |
| citric acid | 310 |
| fructose | 7060 |
| natural flavoring | 18 |

It should be understood that various modifications can be made to the preferred embodiments disclosed herein without departing from the spirit and scope of the invention or without the loss of its attendant advantages. For example, the teaching of this invention may be employed, with little or no modification, for occasional periods of longer than eight days (e.g., a two-week break in a normally weekly schedule) without altering the basic teaching. Thus, other modes of applying the principles described herein are intended to fall within the scope of the invention provided the features stated in any of the following claims or the equivalent of such be employed

I claim:

1. A process for enhancing the energy metabolism of an athlete whereby physical endurance is improved during competition, comprising the steps of: regulating the athlete's dietary and physical conditioning to assure substantially full glycogen storage levels at the outset of said competition; eliminating the consumption by said athlete of substantially all insulin-inducing carbohydrates for a pre-competition period of sufficient duration such that during said competition the amount of insulin within the blood of said athlete will be lowered to about minimum levels; and, administering to said athlete, orally and during said pre-competition period, between about 10 and 50 grams of fructose.

2. The process of claim 1 wherein said pre-competition period comprises at least about 4 hours.

3. The process of claim 1 wherein sodium, potassium, and chloride are administered to said athlete in conjunction with said fructose.

4. The process of claim 1 wherein sodium, potassium, chloride, magnesium, calcium, iron and phosphorous are administered to said athlete in conjunction with said fructose.

5. In a process for enhancing the energy metabolism of an athlete whereby physical endurance is improved during competition and wherein said athlete has been subjected to a dietary and physical conditioning program, to assure substantially full glycogen storage levels at the outset of said competition, the improvement comprising:

eliminating the consumption by said athlete of substantially all insulin-inducing carbohydrates for a pre-competition period of sufficient duration such that during said competition the amount of insulin within the blood of said athlete will be lowered to about minimum levels; and administering to said athlete, orally and during said pre-competition period, at least about 10 grams of fructose.

* * * * *